No. 853,181. PATENTED MAY 7, 1907.
R. N. LIVERETT & J. D. HOOD.
SELF LOADING DUMP CART.
APPLICATION FILED OCT. 6, 1906.

2 SHEETS—SHEET 1.

Witnesses

Inventors
R. N. Liverett,
J. D. Hood,
By
Attorneys

No. 853,181. PATENTED MAY 7, 1907.
R. N. LIVERETT & J. D. HOOD.
SELF LOADING DUMP CART.
APPLICATION FILED OCT. 6, 1906.
2 SHEETS—SHEET 2.
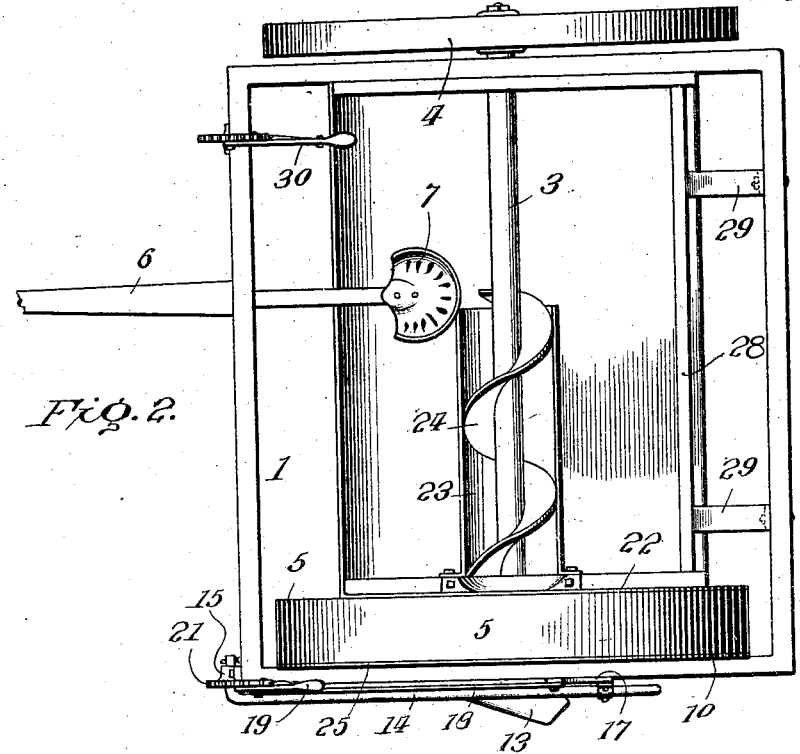
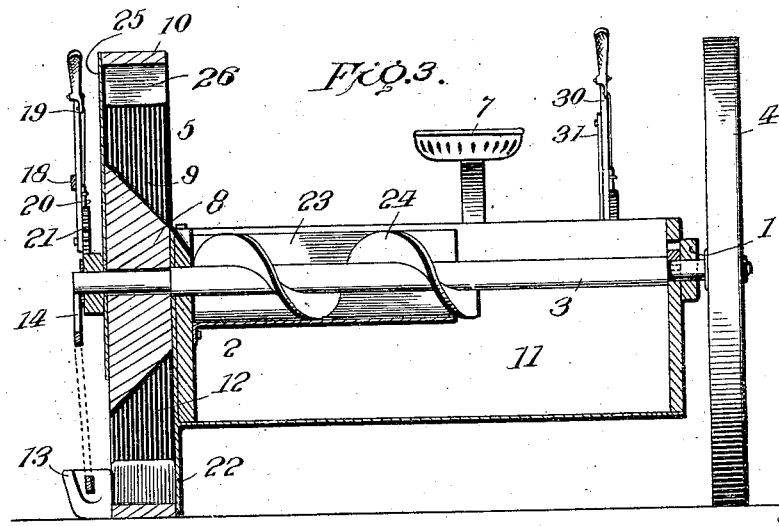

UNITED STATES PATENT OFFICE.

ROBERT N. LIVERETT AND JOHN D. HOOD, OF BOAZ, ALABAMA; SAID LIVERETT ASSIGNOR OF ONE-HALF OF HIS RIGHT TO SAID HOOD.

SELF-LOADING DUMP-CART.

No. 853,181.    Specification of Letters Patent.    Patented May 7, 1907.

Application filed October 6, 1906. Serial No. 337,780.

*To all whom it may concern:*

Be it known that we, ROBERT N. LIVERETT and JOHN D. HOOD, citizens of the United States, residing at Boaz, in the county of Marshall and State of Alabama, have invented certain new and useful Improvements in Self-Loading Dump-Carts, of which the following is a specification.

The object of this invention is to secure a practical and desirable construction of a vehicle, in the form of a wagon or cart especially designed for carrying dirt, earth or the like, and including means for automatically loading the same as it is advanced and mechanism for facilitating the dumping thereof at a suitable point of deposit of the material loaded thereon.

The invention is well adapted for road grading purposes for transporting dirt or like material, and is susceptible of use in various other ways as will be readily apparent on reference to the following description.

Figure 1:
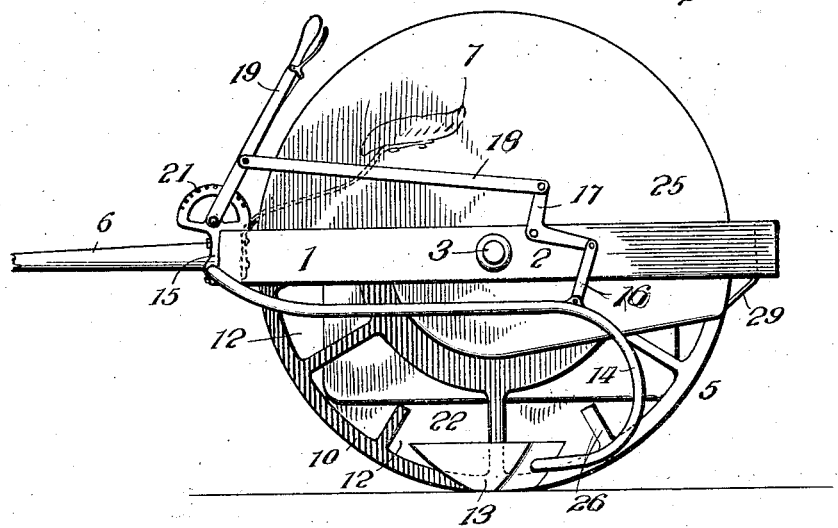
Figure 4:
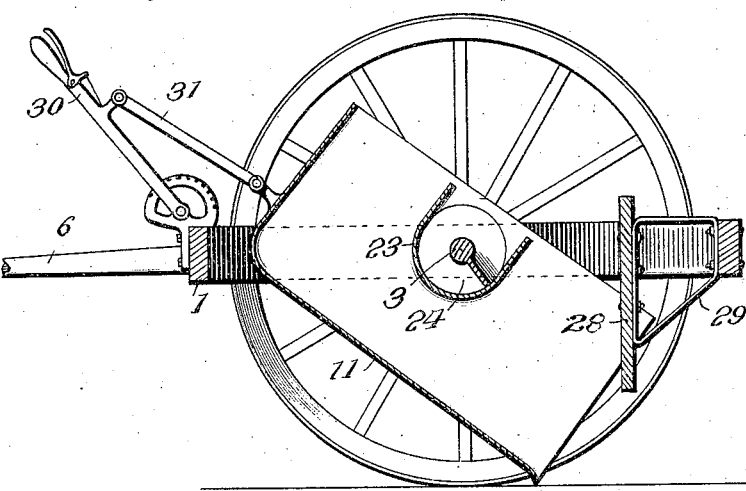

For a full description of the invention and the merits thereof and also to acquire a knowledge of the details of construction of the means for effecting the result, reference is to be had to the following description and accompanying drawings, in which:

Figure 1 is a side elevation of the dumping cart embodying the invention. Fig. 2 is a top plan view. Fig. 3 is a transverse vertical sectional view. Fig. 4 is a longitudinal sectional view showing the body of the cart or wagon in dumping position.

Corresponding and like parts are referred to in the following description and indicated in all the views of the drawings by the same reference characters.

Specifically describing the invention, a cart embodying the same consists mainly of a frame 1 of somewhat rectangular form, opposite sides of which having suitable bearings 2 provided therein, receiving an axle 3 upon which the wheels 4 and 5 of the cart are mounted. The wheel 4 is mounted on an end of the axle 3, and is arranged adjacent to the outer side of one of the sides of the frame 1, said wheel being secured to the axle 3 in any substantial way to effect rotation of the axle when the cart is in motion. It is contemplated to provide a suitable tongue 6 extending forwardly from the frame 1 and substantially attached thereto, a seat 7 for the driver of the cart being also mounted upon the frame 1.

The wheel 5 is of peculiar form and will be hereinafter termed the dirt lifting wheel. Said wheel 5 is arranged within the frame 1 adjacent to the side opposite that at which the wheel 4 is located and though mounted upon the axle 3, the wheel 5 rotates loosely upon and independently of said axle. In specific structure, the wheel 5 is composed of a large hub 8 from which outwardly project the spokes 9 by which the rim 10 of the wheel is carried. The rim 10, as well as the hub and spokes of the wheel 5 are very broad and the spaces between the spokes suffice to form buckets to receive the earth, dirt, or material to be elevated or lifted by the wheel 5 and deposited in the bed or body 11 of the cart. The buckets 12, which are formed by the spaces between the spokes 9, of the wheel 5, are adapted to receive the dirt or material when said buckets are near the ground, during the rotation of the wheel 5, said material entering the buckets from the outer side of the wheel. At the side of the frame 1 adjacent to which the wheel 5 is mounted, is carried an earth loosener in the form of a plow 13 of the mold-board type, said plow being carried by a supporting arm 14 the front end of which extends laterally in front of the frame 1, and is pivotally attached to this portion of the frame by a standard 15 secured thereto. The rear end portion of the arm 14, of the plow is connected by a rod 16 with a bell crank lever 17, which is pivoted to the adjacent side of the frame 1.

The bell crank lever is connected by the rod 18 with a plow operating lever 19 pivoted to the upper portion of the standard 15, at the front of the frame 1. By operating the lever 19, the plow 13 may be raised or lowered to throw the same out of or into action, and thereby govern the elevation of earth or material by the wheel 5. The plow 13 is so arranged that when it is acting on the earth or ground over which the cart is passing, said plow will throw the earth or dirt laterally into the buckets 12 of the wheel 5, which will carry the material upwardly by reason of the continuous rotation of the wheel 5. The lever 19 is adapted for adjustment by means of any conventional latch mechanism, comprising in this instance a catch 20 arranged to engage a toothed segment 21 formed at the upper portion of the standard 15. In order to prevent the dirt discharged laterally by the plow 13 into the buckets 12, of the wheel 5, from passing entirely through the buckets to the inner side of the wheel 5, a guard plate 22 is secured to an adjacent side of the body of the cart and extends downwardly therefrom so as to accomplish the desired result. The lower portion of the guard plate 22 is curved so as to conform with the circular rim 10 of the wheel 5, and this plate forms a closure virtually at the inner side of the wheel 5, for the buckets 12. The hub 8 of the wheel 5 is cut away from its outer portions, or those portions between the spokes 9 to form downwardly inclined bottoms for the buckets 12, whereby when the buckets reach a point wherein they are at the uppermost portion of the wheel, in its rotation, the dirt or material which has been received in the buckets will discharge downwardly into a trough 23 projecting laterally from and secured at one end to the inner face of the adjacent side of the body of the cart. The trough 23 terminates at a point between the sides of the body of the cart and a conveyer 24 is arranged in said trough, said conveyer being of the spiral type and being mounted upon the axle 3 for rotation therewith. The material which is received by the trough 23 as it is discharged from the buckets 12 will be conveyed longitudinally of said trough by the revolving conveyer 24, and discharged from the trough into the body of the cart in an obvious manner. To accomplish a somewhat similar purpose as is accomplished by the guard plate 22, a second guard plate 25 is attached to the frame 1 at the outer side of the wheel 5 and projecting upwardly from the frame. The guard plate 25 is designed to close the outer portions of the buckets 12 when they assume positions above the axle of the wheel 5 to prevent the dirt or material in this portion of the wheel from being displaced therefrom in an outward direction when it should discharge inwardly toward the trough 23. Projecting inwardly from the rim 10 of the wheel 5 intermediate of the spokes 9 thereof, are formed wings 26 which assist in holding the dirt or material in the buckets until they reach the point of discharge thereof into the trough 23.

The foregoing briefly describes the construction and operation of the dirt loosener, the dirt elevating, and the dirt discharging means, by which such dirt is loaded automatically into the body of the cart. The body or bed 11 of the cart is pivotally mounted upon the axle 3, and comprises, a bottom, opposite sides provided with suitable bearings for the axle, a front, and a back 28, which constitutes virtually an end gate. The back or end gate 28, of the body 11 of the cart is attached by means of brackets 29 to the rear end of the frame 1, and is supported thereby entirely in the normal positions of the parts. When the body 11 is receiving the dirt or material from the dirt lifting wheel 5, the rear end of the body is closed by the back or end gate 28. The body 11, however, is so mounted upon the axle 3, as hereinbefore described, that it may be tilted or rocked by means of a lever 30 attached to the front of the frame 1, and thereby have its front end portion raised to cause the bottom to move away from the back or end gate 28 into an inclined position, whereby the material or load received in the body may be dumped or discharged therefrom. The lever 30 may be mounted upon the front portion of the frame 1 in a manner similar to the lever 19, and will comprise any suitable locking mechanism for holding it in an adjustable position so that the body 11 of the cart will be rigidly supported in dumping position, or in a position in which the back or end gate 28 closes the rear portion of said body. The lever 30 is connected by a rod 31, with the front portion of the body 11, of the cart and pivotal movement of the lever will rock or tilt the body 11 in an obvious manner.

The construction and operation of the machine, or cart as hereinbefore set forth, is very simple. It will be advanced or drawn over the ground by any suitable or propelling means and during its advance the earth or ground is loosened and discharged into the dirt lifting wheel 5, is elevated by said lifting wheel and discharged therefrom into the body of the cart from which it may be dumped by operation of the mechanism hereinbefore set forth.

Having thus described the invention, what is claimed as new is:

1. In means of the class described, the combination of a supporting frame, a cart body carried by the frame, a ground wheel supporting the frame, said wheel comprising a hub, a rim, and spokes connecting the hub and rim and forming buckets in connection with the latter, inwardly projecting wings carried by the rim intermediate of the spokes, and means whereby the material elevated by the buckets is discharged into the cart body.

2. In means of the class described, the combination of a supporting frame, a cart body carried thereby, and a wheel supporting the frame, the said wheel comprising a hub formed with flared sides, a rim, and spokes connecting the hub and rim and forming buckets in connection with the latter, the flared sides of the hub serving to deflect the material elevated by the buckets into a cart body.

3. In means of the class described, the combination of a supporting frame, a cart body carried thereby, a wheel supporting the frame, said wheel comprising a hub formed with flared sides, a rim, and spokes connecting the hub and rim and forming buckets in conjunction with the latter, and inwardly projecting wings carried by the rim intermediate of the spokes, the flared formation of the hub serving to deflect the material elevated by the buckets into the cart body.

4. In means of the class described, the combination of a supporting frame, an axle mounted therein, wheels mounted on the axle, a cart body carried by the frame, one of the wheels carrying buckets for elevating dirt, a trough for delivering the dirt into the cart body, and a spiral conveyer located within the trough and operated by the axle.

5. In means of the class described, the combination of a supporting frame, an axle mounted therein, wheels mounted on said axle, one of said wheels being secured to the axle to compel rotation thereof, the other of said wheels constituting a dirt lifting or elevating device, and a conveyer operable by the axle for conveying material discharged from the dirt lifting wheel to the cart body.

6. In means of the class described, the combination of a supporting frame, and axle mounted therein, wheels mounted on said axle, one of said wheels being secured to the axle to compel rotation thereof, the other of said wheels constituting a dirt lifting or elevating device, and a conveyer mounted upon the axle for actuation thereby, for conveying material discharged from the dirt lifting wheel to the cart body.

7. In means of the class described, the combination of a supporting frame, a cart body carried by the frame, a wheel for the cart body, said wheel carrying buckets in its periphery, means carried by the frame for throwing dirt into the buckets from one side of the wheel, a guard plate located upon the opposite side of the wheel, said buckets when in an elevated position discharging upon one side into the cart body, and a guard plate fitting against the opposite side of the upper portion of the wheel.

8. In means of the class described, the combination of a cart body, supporting wheels therefor, one of said wheels comprising a series of buckets, a plow for feeding material to the buckets from the outer side of the wheel when the buckets are in lowermost positions, a guard plate for preventing material from passing from the buckets at the inner side of the wheel when the buckets are receiving material, means for discharging material at the inner side of the wheel from the buckets into the cart body at the inner side of the wheel, and a guard plate for preventing the material in the buckets from passing therefrom in an outward direction when the buckets are in uppermost positions.

9. In means of the class described, the combination of a supporting frame, wheels supporting said frame, a cart body mounted on said frame, and tiltable relative thereto, an end gate for said cart body rigid with the frame, and means for tilting the cart body to effect the movement thereof relative to its end gate, whereby to dump the same.

10. In means of the class described, the combination of a supporting frame, ground wheels supporting said frame, one of said wheels comprising means for elevating dirt or like material, means for discharging the dirt or material from the wheel, a cart body mounted on the frame and adapted to receive material from the wheel aforesaid, an end gate for said cart body rigid with the frame, and means for tilting the cart body relative to its end gate to dump the same.

In testimony whereof we affix our signatures in presence of two witnesses.

ROBERT N. LIVERETT. [L. S.]
JOHN D. HOOD. [L. S.]

Witnesses:
JOHN B. LOGAN,
G. M. E. MANN.